United States Patent
Shiiyama et al.

[11] Patent Number: 5,905,811
[45] Date of Patent: *May 18, 1999

[54] SYSTEM FOR INDEXING DOCUMENT IMAGES

[75] Inventors: Hirotaka Shiiyama, Machida; Katsumi Masaki, Yokohama, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/490,739

[22] Filed: Jun. 15, 1995

[30] Foreign Application Priority Data

Jun. 16, 1994 [JP] Japan .................................. 6-134194

[51] Int. Cl.⁶ .................................................. G06K 9/72
[52] U.S. Cl. ........................................ 382/229; 382/231
[58] Field of Search ................................ 382/181, 182, 382/186, 187, 189, 201, 198, 229–231, 100, 177, 190; 395/751–760, 794–795; 434/167; 707/533

[56] References Cited

U.S. PATENT DOCUMENTS

| | | | |
|---|---|---|---|
| 5,197,107 | 3/1993 | Katsuyama et al. | 382/209 |
| 5,237,627 | 8/1993 | Johnson et al. | 382/198 |
| 5,261,112 | 11/1993 | Futatsugi et al. | 395/795 |
| 5,265,174 | 11/1993 | Nakatsuka | 382/189 |
| 5,315,668 | 5/1994 | O'Hair | 382/159 |
| 5,369,577 | 11/1994 | Kadashevich et al. | 395/759 |
| 5,371,673 | 12/1994 | Fan | 395/751 |
| 5,389,745 | 2/1995 | Sakamoto | 178/18 |
| 5,454,046 | 9/1995 | Carman, II | 382/186 |
| 5,524,065 | 6/1996 | Yagasaki | 382/226 |
| 5,524,066 | 6/1996 | Kaplan et al. | 382/229 |

OTHER PUBLICATIONS

"Multifont Word Recognition System With Application to Postal Address Reading", J. Schurmann, 3rd International Joint Conference On Pattern Recognition, Coronado, CA, Nov. 8–11, 1976, pp. 658–662.

*Primary Examiner*—Jon Chang
*Assistant Examiner*—Jayanti K. Patel
*Attorney, Agent, or Firm*—Fitzpatrick, Cella, Harper & Scinto

[57] ABSTRACT

When texts recognized by an OCR are registered and those texts are searched by a search word, a state in which the search cannot be performed depending on an error recognition at the time of the recognition by the OCR is eliminated. It is an object of the invention to realize a process such that no burden is exerted on an operator or an apparatus by the above state. There are provided an OCR processor for recognizing stored image information and outputting a recognition result while switching the number of candidate characters to be outputted as a recognition result in accordance with a degree of a likelihood; and a document searcher for forming character trains for search from the recognition result and for registering as a search file.

23 Claims, 5 Drawing Sheets

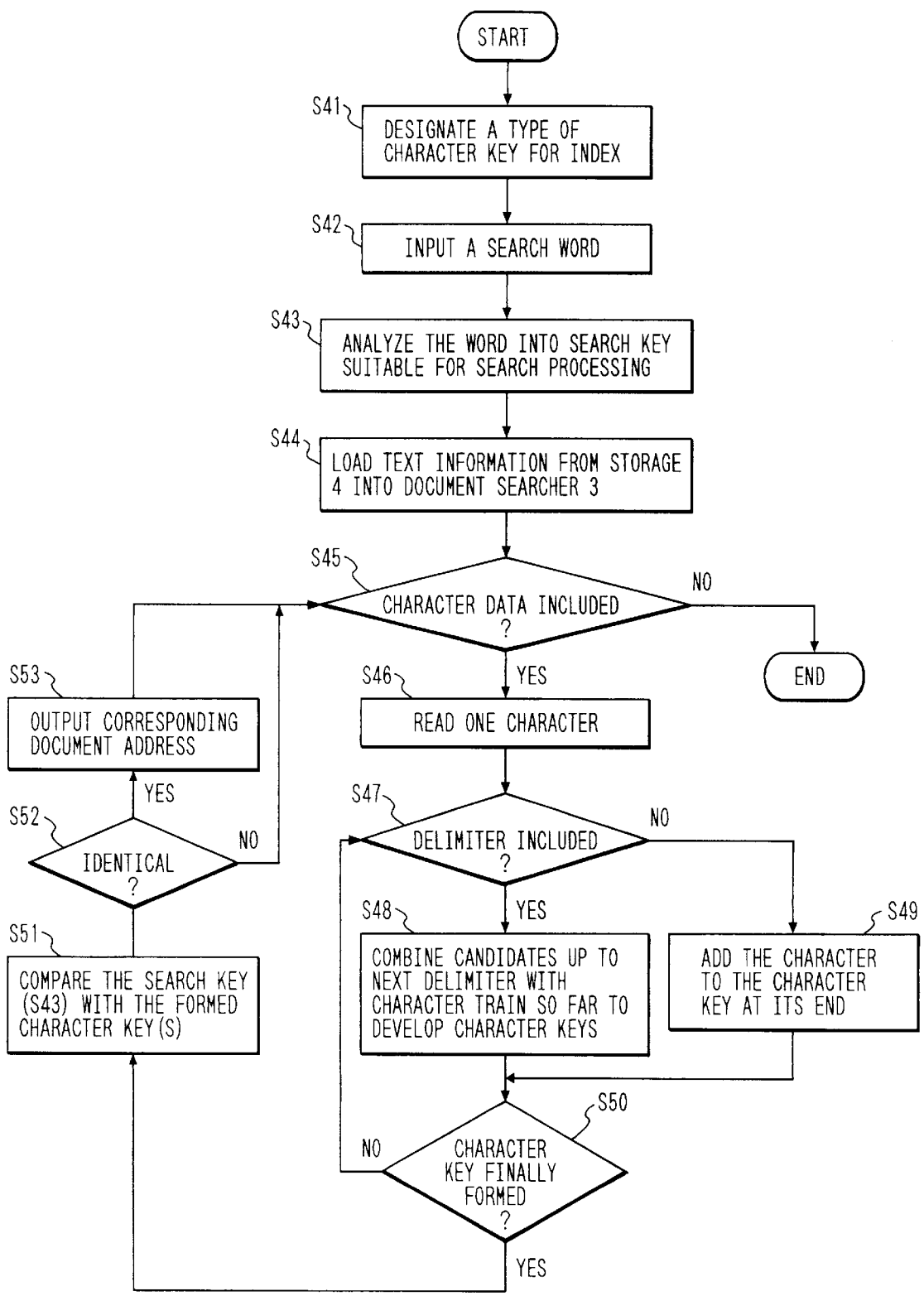

SYSTEM FOR INDEXING DOCUMENT IMAGES

BACKGROUND OF THE INVENTION

1. Field of the Invention

The present invention relates to information processing method and apparatus for converting input image information to a text by a character recognizing function such as an OCR or the like.

The invention also relates to information processing method and apparatus which can form a search data base from a text obtained by converting input image information by a character recognizing function such as an OCR or the like and which can search desired data.

2. Related Background Art

Hitherto, when an input image is recognized by an OCR or the like and is converted to a text, with respect to an input character in which only a candidate character of a low similarity was obtained, as a countermeasure for an erroneous recognition, a fact that the similarity is low is notified to the operator and he judges that whether the candidate word is correct or wrong. When it is wrong, the operator is urged to manually correct the wrong character and input a correct character.

According to such a method, however, the operator must not only input an image to be converted to a text but also perform the correcting operation, so that there is a drawback such that the operator feels a burden.

There is also a method whereby not only a result of a character recognition is outputted but also a candidate character obtained by the character recognition is compared with a word dictionary or a knowledge base, thereby correcting an erroneously recognized character without a help of the operator.

According to the above methods, however, there are drawbacks such that the word dictionary or knowledge base has to be held in a memory for the correcting process and, further, such a correcting process using them is complicated and takes a long time and becomes a burden on the apparatus.

SUMMARY OF THE INVENTION

It is an object of the invention to eliminate a load of an operator or an apparatus to correct an erroneously recognized character that may occur in a character recognizing process of an OCR or the like to a correct character and to enable it to be effectively used in other processes.

Another object of the invention is to form a data base which can be searched at a high quality without executing a surplus load process such as a correcting process for an erroneously recognized character that may occur in a character recognizing process of an OCR or the like.

BRIEF DESCRIPTION OF THE DRAWINGS

FIG. 5 is a flowchart for a process to search without previously forming a search file.

DETAILED DESCRIPTION OF THE PREFERRED EMBODIMENT

An embodiment of the invention will now be described in detail hereinbelow.

Figure 4:
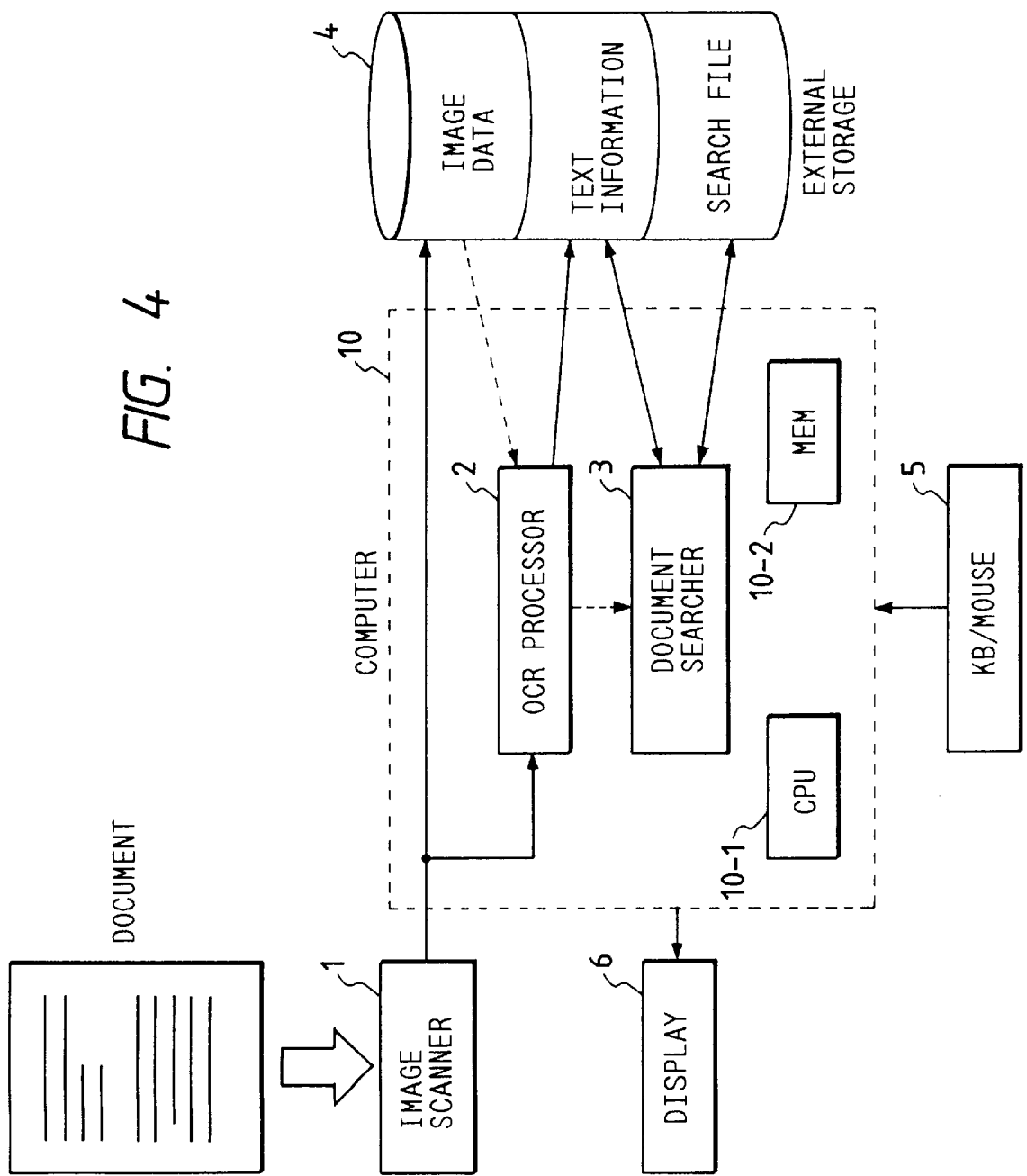
FIG. 4 is a constructional block diagram of an information processing apparatus in an embodiment.

FIG. 4 is a constructional block diagram of a processing system in the embodiment.

An image scanner 1 is image input means for optically reading out an original image of a document serving as a recognition target. A method of inputting an image is not limited to such a method of optically reading an image by the image scanner or the like but it is also possible to input an image of a hand-written character inputted by input means such as digitizer, mouse, or the like which can input coordinates. A keyboard/mouse 5 is input means for inputting various commands or instructing information by the operator. A search word and a search condition at the time of the searching process are also inputted by the keyboard or mouse. A display 6 is display means such as CRT or liquid crystal display for displaying the information inputted from the keyboard/mouse 5, image information inputted from the image scanner 1 or the like, a progress of the processes, and a result of the process. An external storage 4 is storage means for storing image data, text information, and search file inputted from the image scanner. A computer 10 performs various kinds of information processes by a control of a CPU 10-1. Control programs of various kinds of information processes as shown in flowcharts, which will be described hereinlater, have been stored in a memory 10-2. The CPU 10-1 executes and controls various processes in accordance with the control programs. A dictionary which is used for a character recognition has been also stored in the memory 10-2. As a control program stored in the memory 10-2, a control program which was read as necessary by external storage means or the like can be also used. In the embodiment, there are provided an OCR processor 2 and a document searcher 3 to execute main processes which are executed by the computer 10 and the embodiment will now be explained. A method of the character recognition is not limited to the OCR process, so long as a character is a hand-written character composed of strokes inputted by a digitizer, a mouse, or the like, it is sufficient to provide a processing unit for performing an on-line character recognition suitable for such a character.

Figure 1:
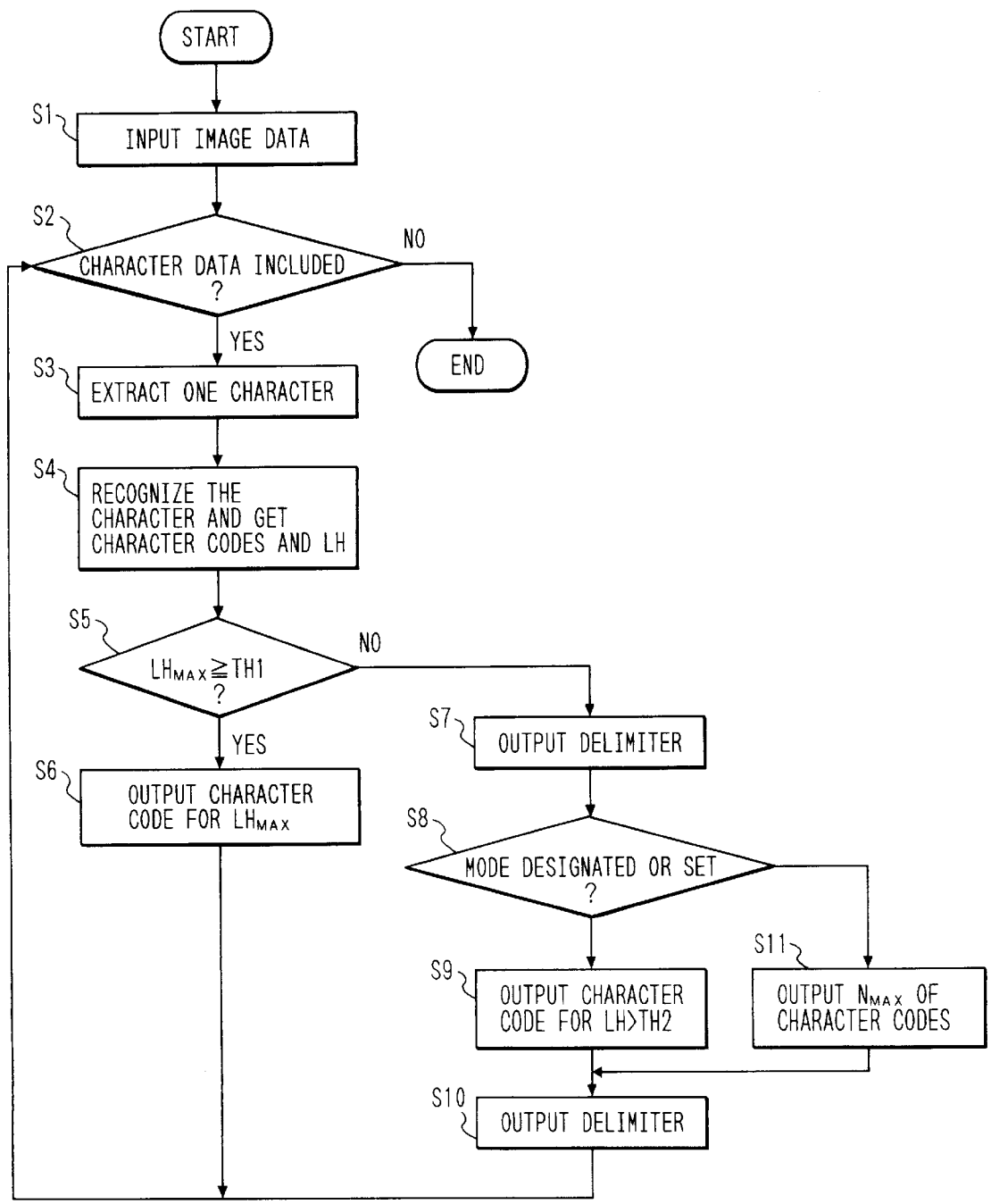
FIG. 1 is a flowchart for an OCR process.

A process to convert image data of an original image inputted by the image scanner 1 or the like to text information is shown in a flowchart of FIG. 1 and will now be described.

The image data stored in the external storage 4 and inputted by the image scanner 1 or the like is inputted to the OCR processor 2 (S1). A check is made to see if character data is included in the inputted image data or not (S2). If YES, the image data of one character is extracted (S3). The extracted one character is compared with the dictionary, thereby obtaining a plurality of character codes as recognition results and a likelihood LH as a similarity with dictionary data indicated by each character code (S4). Among the character codes obtained as recognition results in S4, a maximum likelihood $LH_{MAX}$ is compared with a predetermined significance likelihood judgment threshold value Th1 stored in the memory 10-2 (S5). When the likelihood is equal to or larger than Th1, it is judged that the recognition result is correct and such one character code among the plurality of character codes is outputted as a recognition result (S6). When the likelihood is smaller than Th1 in S5, in order to store a plurality of recognition results for image data of one character code, a delimiter is outputted as identification (hereinbelow, referred to as an ID) information (S7). In S8, the processing routine advances to S9 or S11 in accordance with a mode designated by the operator or a mode set by the system or the likelihood obtained in S4. In S9, among the plurality of likelihoods obtained in S4, a character code corresponding to the likelihood larger than a predetermined low recognition likelihood judgment threshold value Th2 stored in the memory 10-2 is outputted as a result corresponding to the image data of one character code. In S11, among the plurality of character codes obtained in S4, the character codes of the number Nmax of maximum recognition candidates are sequentially outputted in accordance with the order from the character code having the largest likelihood as a result corresponding to the image data of one character code. When the result corresponding to the image data of one character code is outputted, a delimiter is outputted as ID information indicative of the end of the result of the characters (S10).

When the recognition of the image data of one character code and the output of the result are finished, the processes in S3 to S11 are repeated while updating the image data serving as a target until it is judged in S2 that no remaining character data is included.

Such code information outputted in S6 to S11 is sequentially stored as text information into the external storage 4.

By such processes, a situation such that the recognition results are narrowed to one in the case where an OCR recognition likelihood is low and there is no confidence in the recognition is avoided, a plurality of optimum recognition candidates corresponding to the recognition likelihoods can be selected, and the effective recognition candidate information can be effectively stored and used without abandoning it. A search file forming process in case of instructing to form a search file so that the text information stored by the above processes can be used for a search hereinlater is shown in a flowchart of FIG. 2 and will be described.

In case of instructing to form the search file for the text information stored in the external storage 4, a type of character key for index when the designated text data is registered to the search file is designated (S21). The designated text information is loaded from the external storage 4 to the document searcher 3 (S22). Data of one character code is read out from the loaded text information (S24). When it is judged that the character code indicates a delimiter (S25), a plurality of candidates up to the next delimiter are combined with the character train so far, thereby developing a plurality of character keys. When it is judged that the character code doesn't indicate a delimiter in S25, such one character code is added to the character train of the character key at its end (S27). The processes in S25 to S27 are repeated until the completion of the character key is judged in S28.

When it is judged that the character key is completed in S28, the formed character key (single or plural) is added to the index information in the search file in the external storage 4 (S29).

The processes in S24 to S29 are repeated until all of the character data is processed in S23, thereby completing the formation of the search file of the loaded text information.

By such processes, a plurality of recognition candidate characters are combined with characters before and after those characters from the text information obtained by recognizing the input image and the character train is developed in accordance with the type of character key of the index to be used, thereby previously forming an index. Therefore, it is possible to reduce a leakage of the search due to the error recognition.

Figure 3:
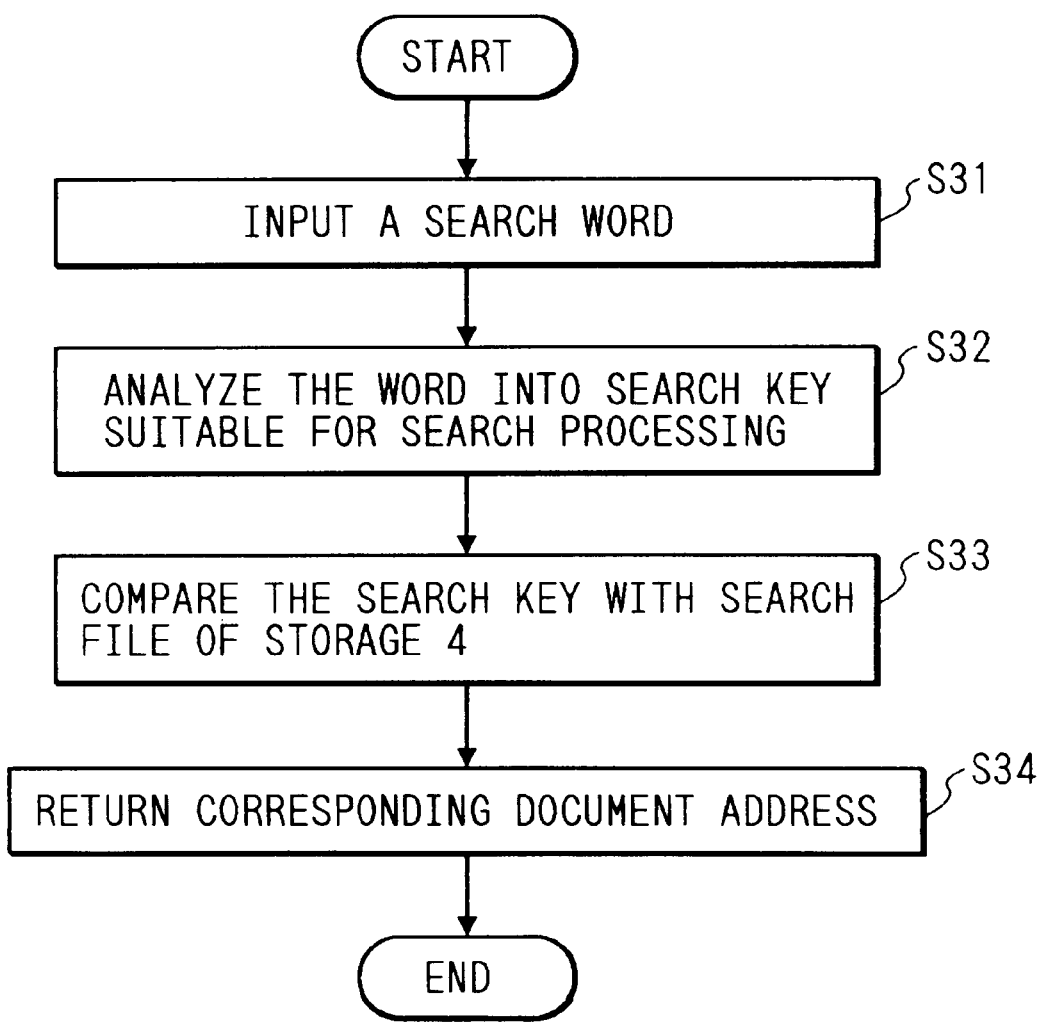
FIG. 3 is a flowchart for a document searching process.

A searching process which is executed by using the search file formed as mentioned above is shown in a flowchart of FIG. 3 and will now be described.

A search word is inputted in accordance with an instruction of the searching process (S31). The input search word is analyzed into a search key suitable for the searching process (S32). The search key is compared with the search file in the external storage 4 (S33). When an index that is matched with the search key is found, document address information corresponding to such an index is returned to the application side (S34).

The image data specified by the document address information and stored in the external storage 4 is displayed as a search result to the display 6.

A flowchart of FIG. 5 shows processes such that characters are combined with the characters before and after the recognition candidate character group from the text information and developed every time the searching process is instructed, thereby comparing with the inputted search word without previously forming the search file.

In case of instructing to form the search file for the text information stored in the external storage 4, a type of character key for the index when the instructed text data is registered to the search file is designated (S41) and a search word is inputted (S42). The inputted search word is analyzed to the search key suitable for the searching process (S43). The instructed text information is loaded to the document searcher 3 from the external storage 4 (S44). Data of one character is read out from the loaded text information (S46). When it is judged that the character code indicates the delimiter (S47), a plurality of candidates up to the next delimiter and the character train so far are combined, thereby developing a plurality of character keys. When it is judged that no delimiter is included in S47, such one character is added to the character train of the character key at its end (S49). The processes in S47 to S49 are repeated until it is judged that the character key is completed in S50.

When it is judged that the character key has been completed in S50, the formed character key (single or plural) and the search key obtained in S43 are compared (S51). When they are identical (S52), a document address in which the image data of the document is stored as a search result is outputted (S53).

As for the data base, a plurality of records are also formed by processes similar to the above processes, so that it is possible to search with little leakage by using the data base.

A specific example will now be explained.

It is now assumed that a sentence such as "DATA" was included in a document.

It is now assumed that when the above sentence is inputted by the image scanner 1 and "T" is recognized in an initial recognition step S4 by the OCR processor 2, the recognition likelihood for such a character is smaller than Th1 in spite of the fact that the recognition likelihoods of the other characters are equal to or larger than Th1. It is further assumed that the recognition candidates have similar likelihoods smaller than Th2. As a result, the process in S11 is selected in S8 and Nmax candidates are sequentially outputted in accordance with the order from the candidate having a high likelihood.

It is assumed that four candidates "I", "T", "Y", and "J" are consequently outputted.

The OCR processor 2 describes the above plurality of candidate characters in the following format. In this instance, when the delimiter to be outputted in S7 and S10 assumes "★", the following format is obtained.

★ [the number of candidates][candidate character 1][candidate character 2][candidate character 3]★

Therefore, the above four candidates are outputted in correspondence to "T" in the example and it is judged that the likelihoods of the other characters are larger than Th1 in S5. An expression of "DATA" in the case where one character of the largest likelihood is outputted as a candidate character in S6 is as follows.

"DA★4ITYJ★A"

Such a character code group is stored as text information to the external storage 4.

Figure 2:
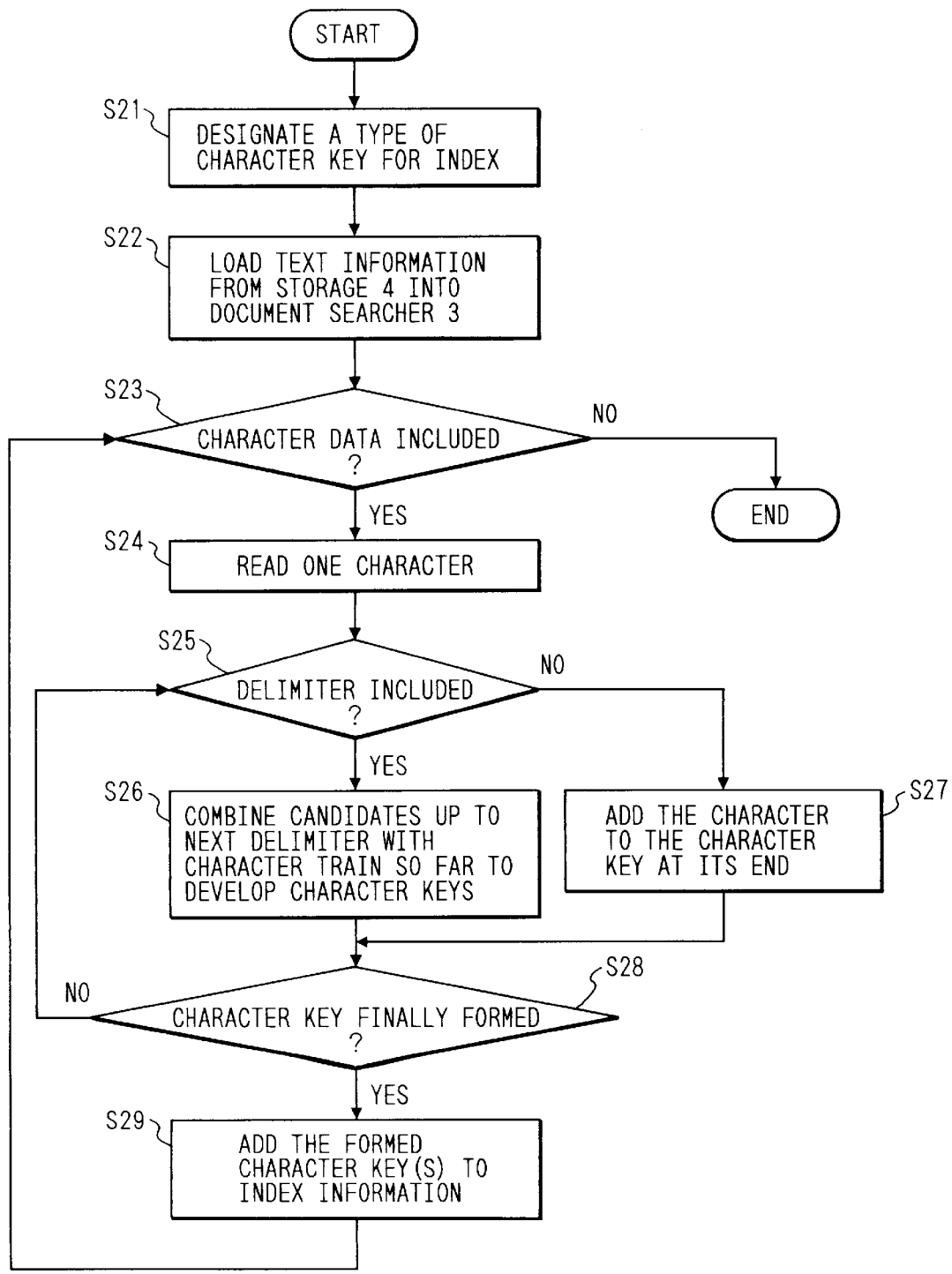
FIG. 2 is a flowchart for a search file forming process for a document search.

On the other hand, the document searcher 3 interprets the format and forms a search file in accordance with the flowchart of FIG. 2.

DAIA

DATA

DAYA

DAJA

Therefore, when the search word such as "DATA" is inputted from the keyboard and the document searcher 3 executes the document searching process in accordance with the search word, the document can be also searched.

In the embodiment, although the example for use in the document search has been explained, the invention can be also applied to the search using the data base.

The invention can be also applied to the extraction of a document key word, a page key word, or the like by the OCR.

Further, the invention can be also applied by a similar method to the case where the recognition likelihood of partial information of an optical reading apparatus by an OMR or bar codes is low.

According to the invention as described above, a situation such that in the case where the OCR recognition likelihood is low and it is not judged that the recognition is sure, the recognition candidate is narrowed to one is avoided, a plurality of optimum recognition candidates corresponded to the recognition likelihood are selected, and the effective recognition candidate information can be stored and effectively used without abandoning it.

As described above, according to the invention, the manual correcting operation of the recognition result is eliminated, the processes from the image input to the storage of the image data and text data via the OCR can be performed without intervening the operator, a processing load of the apparatus can be reduced, a processing speed can be raised, and a cheap apparatus can be provided.

As mentioned above, according to the invention, in the case where there are a plurality of recognition candidates for an input image of one character, characters are combined with the characters before and after such characters and they are developed and a plurality of indices are formed, so that a leakage of the search due to the error recognition can be reduced.

What is claimed is:

1. An image data processing method comprising the steps of:

inputting image data including character image data;

comparing a character image extracted from the inputted image data with dictionary data to obtain a plurality of character codes and corresponding likelihoods of the character codes for the extracted character image;

determining a plurality of candidate character codes corresponding to each extracted character image, the plurality of candidate character codes being determined in accordance with the likelihoods obtained in said comparing step;

generating a plurality of trains of character codes from combinations of the plurality of candidate character codes determined in accordance with the obtained likelihoods and in accordance with character codes for character images adjacent to the extracted character image; and storing the plurality of generated trains of character codes with the inputted image data for use as search keys to search for and retrieve the input image data.

2. A method according to claim 1, wherein said plurality of candidate character codes is determined in accordance with a result obtained by comparing said likelihoods with a threshold value.

3. A method according to claim 1, wherein information stored with said image data includes a number relating to the plurality of generated trains of character codes.

4. A method according to claim 1, wherein the plurality of generated trains of character codes stored with said inputted image data is distinguished from other information stored with the inputted image data by ID information which can identify information corresponding to the extracted character image.

5. A method according to claim 1, wherein said stored plurality of generated trains of character codes and a designated search word are compared and the image data stored with the character train which correspond to said search word is identified.

6. A method according to claim 5, wherein said identified image data is outputted by a printer.

7. A method according to claim 5, wherein said identified image data is outputted by display means.

8. A method according to claim 1, wherein said inputted image data is image data inputted by a scanner.

9. A method according to claim 1, wherein said inputted image data is image data inputted by a coordinate input apparatus.

10. A method according to claim 1, wherein said character image and said dictionary data are compared by an optical character recognizing method.

11. A method according to claim 1, wherein said character image and said dictionary data are compared by an on-line character recognizing method.

12. An image data processing apparatus comprising:

inputting means for inputting image data including character image data;

comparing means for comparing a character image extracted from the inputted image data with dictionary data to obtain a plurality of character codes and corresponding likelihoods of the character codes for the extracted character image;

determining means for determining a plurality of candidate character codes corresponding to each extracted character image, the plurality of candidate character codes being determined in accordance with the likelihoods obtained by said comparing means;

generating means for generating a plurality of trains of character codes from combinations of a plurality of candidate character codes determined in accordance with the obtained likelihoods and in accordance with character codes for character images adjacent to the extracted character image; and storing means for storing the plurality of generated trains of character codes with the inputted image data for use as search keys to search for and retrieve the input image data.

13. An apparatus according to claim 12, wherein said determining means determines a number of the plurality of candidate character codes by the result obtained by comparing said obtained likelihoods with threshold values.

14. An apparatus according to claim 12, wherein information stored with said image data includes a number relating to the plurality of generated trains of character codes.

15. An apparatus according to claim 12, wherein the plurality of generated trains of character codes stored with said inputted image data is distinguished from other information stored with the inputted image data by ID information which can identify that it is information corresponding to the extracted character image.

16. An apparatus according to claim 12, further comprising:

means for designating a search word;

comparing means for comparing the plurality of generated trains of character codes stored by said storing means and said designated search word; and means for identifying image data stored with a character train corresponding to the search word.

17. An apparatus according to claim 16, further having an interface to a printer to output the image information, and wherein said identified image data is outputted by said printer.

18. An apparatus according to claim 16, further including an interface to display means for displaying image information, and wherein said identified image data is displayed by said display means.

19. An apparatus according to claim 12, further including an interface to a scanner to input image information, and wherein the image data input by said input means is input by said scanner.

20. An apparatus according to claim 12, further having an interface to coordinate input means, and wherein said input image data is input by said coordinate input apparatus.

21. An apparatus according to claim 12, wherein said comparing means compares by an optical character recognizing method.

22. An apparatus according to claim 12, wherein said comparing means compares by an on-line character recognizing method.

23. A computer-readable memory medium storing computer-executable process steps to process image data, the steps comprising:

an inputting step to input image data including character image data;

a comparing step to compare a character image extracted from the inputted image data with dictionary data to obtain a plurality of character codes and corresponding likelihoods of the character codes for the extracted character image;

a determining step to determine a plurality of candidate character codes corresponding to each extracted character image, the plurality of candidate character codes being determined in accordance with the likelihoods obtained in said comparing step;

a generating step to generate a plurality of trains of character codes from combinations of a plurality of candidate character codes determined in accordance with the obtained likelihoods and in accordance with character codes for character images adjacent to the extracted character image; and a storing step to store the plurality of generated trains of character codes with the inputted image data for use as search keys to search for and retrieve the input image data.

* * * * *